Dec. 23, 1941. T. A. BOWERS 2,267,322
PISTON RING
Filed Nov. 25, 1939
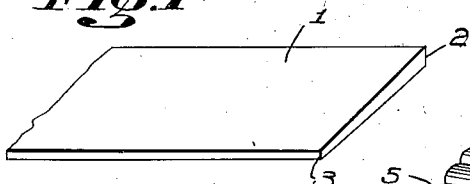
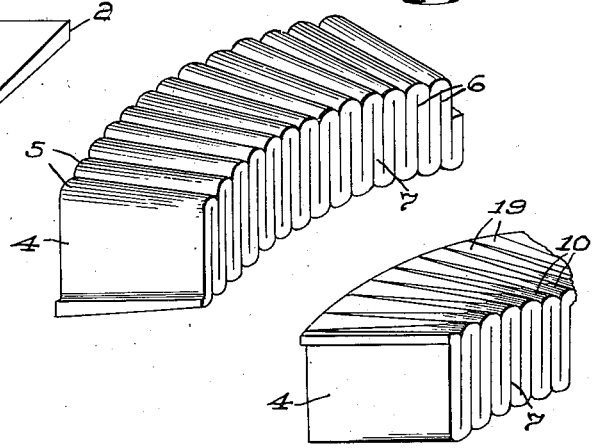
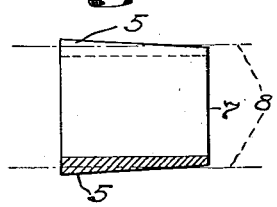
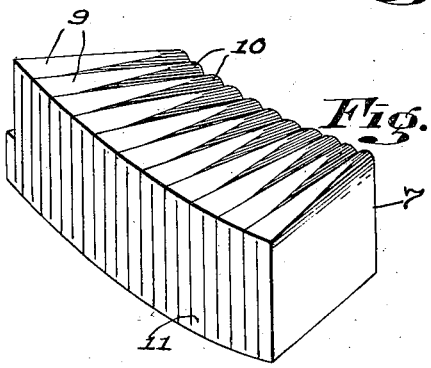
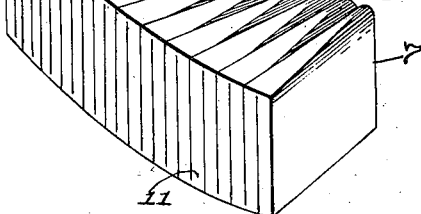
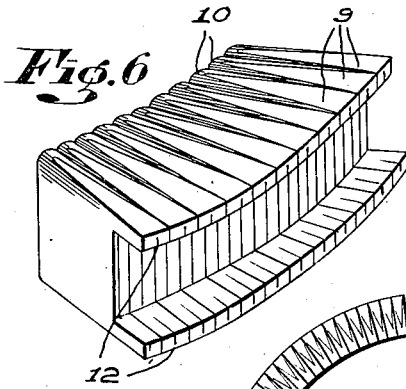
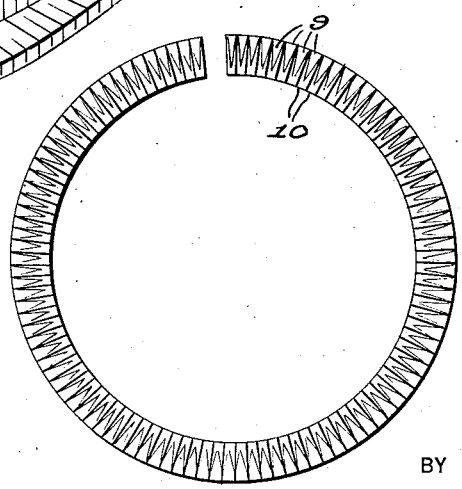
INVENTOR
Thomas A. Bowers
BY
ATTORNEY Patented Dec. 23, 1941

2,267,322

UNITED STATES PATENT OFFICE 2,267,322

PISTON RING

Thomas A. Bowers, Boston, Mass., assignor to Power Research Corporation, Boston, Mass., a corporation of Massachusetts Application November 25, 1939, Serial No. 306,096

12 Claims. (Cl. 309—45)

This invention relates to piston rings and methods of making such rings from sheet material.

In the fabrication of piston rings from sheet metal, objectionable weaknesses may develop. The points of bending of the metal usually comprise the top and bottom crown portions of a piston ring, and these top and bottom crowns or sides of the ring are required to be of substantially flat character for properly seating in a piston groove of a piston. To effect a substantially flattened seating surface, the top and bottom crown-forming portions must be flattened off, which results in the thinning of the metal at these points, thereby creating weakened areas, which upon wear and constant flexing may break. This difficulty has been largely overcome by preforming those portions of the material which comprise the crowns with increased thicknesses of metal. However, the equipment and operations necessary for effecting such a preformed crown thickness are to some extent expensive, and simpler and cheaper ways of effecting seating surfaces without weakening the ring are desirable.

The chief object of the present invention, therefore, is to improve fabricated packing rings and their methods of manufacture and to devise a structure which presents adequate seating surfaces and yet retains proper strength characteristics. It is a further object of the invention to provide a simple, cheap and efficient method of making piston rings, which is adapted to large scale production and by which piston rings may be produced of either the compression type or the oil metering type.

These and other objects of the invention will be readily understood from the following description when read in connection with the accompanying drawing, and the novel features will be more particularly pointed out in the appended claims.

In the accompanying drawing:

Fig. 1 is a fragmentary perspective view illustrating a sheet of material employed in fabricating the ring of the invention.

Fig. 2 is another perspective view illustrating a strip of material such as that shown in Fig. 1 folded upon itself to fragmentarily indicate a piston ring body.

Fig. 3 is a diagrammatic view indicating the varying thickness of the material at the crown portions as effected by the step indicated in Fig. 2.

Fig. 4 is another perspective view illustrating a further step of treating the reversely folded ring of Fig. 2 to effect flat top and bottom surfaces.

Fig. 5 is still another perspective view fragmentarily illustrating the front of a ring formed by the flattening step indicated in Fig. 4.

Fig. 6 is still another perspective view indicating the step of recessing the peripheries of the structures of Figs. 4 and 5 to effect an oil metering member; and Fig. 7 is a plan view of the finished ring.

In the construction shown, 1 indicates a strip or sheet of resilient material such as sheet metal. It will be noted that the strip or sheet is characterized by being of a wedge-shape and has an edge 2 of a greater thickness than an opposite edge 3. This material is reversely folded upon itself to comprise an annular body as has been illustrated in Fig. 2 in which it will be observed that there are effected web portions 4 and crown portions 5. One side of the reversely folded body along edge 2 will be higher than an opposite side along edge 3, due to the wedge or bevel cross section of the strip 1, as just described. A feature of a reversely folded strip of material such as that shown in Fig. 1 consists in the fact that by using such a material, the operation of reversely folding automatically effects an annular formation, due to the fact that the folds will be thicker on the outside than on the inside. This eliminates an annular forming step in the construction of the ring.

The annular body is characterized by a highly developed flexibility due to the fact that the material is contractible and extensible which allows it to uniformly adapt itself to cylinder peripheries, particularly cylinder peripheries which have been worn out of round or into other non-uniform shapes. However, it is desirable to flatten out the crowns 5 and effect flat seating surfaces for allowing the annular body to properly seat in the groove of a piston. The flattening which may be effected is limited by the amount of metal occurring between the tip of any one of the interstices 6 and the top side of crowns 5. It may be readily seen that any appreciable flattening of the metal between the tips of the interstices and the tops of the crowns all the way along any one of the crowns may be sufficient to so weaken that particular crown that the ring will tend to break and fall apart. Therefore, it is desirable to maintain at least portions of every one of the crowns, both top and bottom of the ring, at the thickness which it normally has when it is folded up.

In accordance with the present invention, a seating surface for a ring such as shown in Fig. 2 is effected at both top and bottom sides thereof, and each of the crowns at both the top and bottom sides is preserved in part in its original thickness. This is effected by flattening the outside of the ring along its crowns both top and bottom in the manner illustrated in Fig. 4. This flattening may be effected by a swaging operation carried out with rolls or dies, as may be found desirable.

It will be seen that the crowns 5 normally occur in a somewhat angular form, diverging from the inner periphery 7 outwardly, and this construction, therefore, is particularly suitable to a flattening operation at the outer portions thereof, and at the same time the top and bottom sides of the ring are made substantially parallel, as has been diagrammatically indicated in Fig. 3 by the broken lines 8. There results by this particular flattening operation described, a ring of substantially rectangular cross section, having flattened seating portions 9 at the top and bottom sides thereof, and further having unflattened crown portions 10 which have not been weakened in any respect at either the top or bottom side of the ring.

In Fig. 5 the outer periphery 11 of a ring formed by the steps indicated in Figs. 2 and 4, has been more clearly illustrated, and it will be noted that a substantially conventional ring shape is attained. The seating surfaces 9 are adequate for purposes of sealing the ring in its groove at one side or the other, according to the stroke of the piston, and there is effected sufficient crown thickness and strength at the rear portions of the ring to afford long ring life. The method of effecting these surfaces is a simple, fast, and efficient one, which is adapted to large scale production and may be accomplished with a minimum of equipment and labor.

If desired, the ring fragmentarily illustrated in Figs. 4 and 5 may be employed for oil metering purposes, either as it is or in a modified form. One means of modifying the ring for oil metering purposes has been illustrated in Fig. 6 in which the outer periphery of the ring has been recessed by some suitable cutting operation as turning, to effect oil scraping edges 12 occurring circumferentially of the ring at the top and bottom therearound. It is pointed out that the flattened surfaces 9 are further helpful in effecting oil scraping edges since they provide substantially square-cut segments for comprising the scraping edges. It may further be desired to effect further forming operations on the edges, as by rolling to thin them, or to effect other desirable shapes, and Fig. 6 is intended to be illustrative of either of such formations of oil scraping edges.

It will be seen that there has been disclosed a novel, efficient and cheap piston ring which combines cheapness with adequate strength, and which is particularly adapted to effecting seating surfaces and to allowing oil metering edges to be formed on the ring. The use of the wedge-shaped stock has the advantage above noted of permitting automatic folding of the material into an annular shape, which avoids the step of forming a straight length of reversely folded stock of uniform cross section into annular form. The wedge-shaped stock also makes possible a flattened ring which is maintained of substantially rectangular cross section.

While I have shown a preferred embodiment of the invention, it should be understood that various changes in materials, procedures and equipment may be resorted to as for example in the forming or cutting tools or in the application of the cutting or forming steps described, in keeping with the spirit of the invention as defined by the appended claims.

Having described my invention, I claim:

1. A packing for a piston comprising a resilient sheet metal reversely folded upon itself to comprise an annular body having crown portions and connecting web portions, said crown portions being flattened throughout a portion only of their radial length at the top and bottom sides of the said ring, to present parallel surfaces for seating said ring in a piston ring groove.

2. A piston ring comprising an annular body having a flat seating surface which extends around the ring and throughout a portion only of its radial width, said annular body including a plurality of layers of piston ring material and connecting crown portions of arcuate shape, and the arcuate crown portions forming a side of the ring which is a continuation of the said flat seating surface.

3. A piston ring comprising a resilient sheet material folded upon itself to form a compressible and extensible annular body made up of crowns and connecting web portions, each of said crowns being flattened to provide upper and lower flat inwardly tapering seating surfaces, said web portions being recessed at the outer periphery of the ring to form upper and lower circumferential edges continuous with the said flattened surfaces.

4. A piston ring comprising a plurality of axially disposed layers of sheet material, said layers of sheet material being joined together by arcuate crown portions at opposite sides of the ring, said crown portions presenting throughout a portion only of their radial length flattened surfaces adapted to form land surfaces for the said ring.

5. A piston ring comprising a plurality of layers of sheet material secured together by bent portions of the sheet material, said bent portions presenting arcuate crowns which extend throughout a part of the radial width of the ring, said bent portions also presenting flat surfaces which extend radially of the ring and are a continuation of the arcuate crowns.

6. A piston ring comprising a plurality of layers of sheet material of wedge-shaped cross section secured together by bent portions of the sheet material, said bent portions presenting arcuate crowns which extend throughout a part only of the radial width of the ring and flat crowns at an outer side of the ring, the said arcuate-shaped crowns being of an axial thickness greater than the thickness of the sheet material at the flat crown portions.

7. A piston ring comprising a plurality of layers of sheet material joined together by crowns at opposite sides of the ring, said crowns throughout a portion of their radial length presenting scalloped portions, said crowns also presenting tapering flattened surfaces which are a continuation of the scalloped portions.

8. A piston ring comprising a strip of sheet material reversely folded upon itself to present crown portions and connecting web portions, each of said crowns being flattened throughout a portion of its length to present tapering flattened surfaces contiguously arranged to provide land surfaces of a radial width less than the width of the strip of sheet material.

9. A piston ring comprising a resilient sheet material reversely folded upon itself to present crown portions and connecting web portions, the said sheet material being of a thickness along one edge greater than its thickness along an opposite edge, the said crowns being flattened throughout a portion only of their radial length to provide parallel land surfaces which extend for a portion only of the radial width of the ring.

10. A piston ring comprising a strip of sheet material reversely folded upon itself to form an annular body having crowns and connecting webs, said material being of a thickness along one edge greater than its thickness along an opposite edge, said crowns throughout a portion of their radial length at opposite sides of the ring being flattened to form land surfaces, and arcuate-shaped crown portions extending angularly from the land surfaces in a direction generally radial of the ring.

11. A piston ring comprising a plurality of layers of sheet material secured together by bent portions of the sheet material, said bent portions presenting crowns extending radially of the ring, said crowns being flattened through a part only of their radial length, said flattened parts extending for more than one-half of the radial length of the crowns.

12. A piston ring comprising a plurality of layers of sheet material secured together by bent crown portions of the sheet material, said ring as a whole being thicker at its outer periphery than at its inner periphery in a direction axially of the ring, said ring presenting flat land surfaces on the crowns, for engagement with a piston groove, the land surfaces tapering inwardly from the sides of their respective crown portions.

THOMAS A. BOWERS.